(12) United States Patent
Dorfman et al.

(10) Patent No.: US 8,868,856 B2
(45) Date of Patent: Oct. 21, 2014

(54) STORAGE SYSTEM WITH REDUCED ENERGY CONSUMPTION

(75) Inventors: Michael Dorfman, Ramat HaSharon (IL); Yechiel Yochai, Moshav Aviel (IL)

(73) Assignee: Infinidat Ltd., Herzliya (IL)

( * ) Notice: Subject to any disclaimer, the term of this patent is extended or adjusted under 35 U.S.C. 154(b) by 436 days.

(21) Appl. No.: 13/173,749

(22) Filed: Jun. 30, 2011

(65) Prior Publication Data

US 2012/0011312 A1   Jan. 12, 2012

Related U.S. Application Data (60) Provisional application No. 61/360,643, filed on Jul. 1, 2010.

(51) Int. Cl.
| | |
|---|---|
| G06F 13/00 | (2006.01) |
| G06F 13/28 | (2006.01) |
| G06F 12/08 | (2006.01) |
| G06F 17/30 | (2006.01) |
| G06F 1/32 | (2006.01) |
| G06F 11/14 | (2006.01) |

(52) U.S. Cl.
CPC ...... G06F 12/0866 (2013.01); G06F 17/30088 (2013.01); G06F 1/3221 (2013.01); G06F 1/3268 (2013.01); G06F 11/1448 (2013.01); G06F 2212/261 (2013.01); G06F 2212/312 (2013.01); Y02B 60/1246 (2013.01)
USPC ..... 711/161; 711/162; 711/165; 711/E12.103

(58) Field of Classification Search
CPC ................................................ G06F 17/30088
See application file for complete search history.

(56) References Cited

U.S. PATENT DOCUMENTS

| | | | |
|---|---|---|---|
| 7,302,539 B2 * | 11/2007 | Korgaonkar et al. ......... 711/162 |
| 7,552,297 B2 | 6/2009 | Zohar et al. |
| 2004/0068610 A1 * | 4/2004 | Umberger et al. ............ 711/114 |
| 2006/0107099 A1 | 5/2006 | Pinheiro et al. |
| 2009/0129193 A1 | 5/2009 | Joshi et al. |
| 2009/0249001 A1 | 10/2009 | Narayanan et al. |
| 2010/0027147 A1 | 2/2010 | Subramanian et al. |

OTHER PUBLICATIONS

Colarelli, Dennis et al.,"The Case for Massive Arrays of Idle Disks (MAID)," Dept. of Computer Science, University of Colorado, Boulder, Jan. 2002, pp. 1-6.

Li, Dong et al., "EERAID: Energy Efficient Redundant and Inexpensive Disk Array," Department of Computer Science and Engineering, University of Nebraska—Lincoln, ACM, 2004, pp. 1-6.

Gurumurti-1I, Sudhanva et al., "DRPM: Dynamic Speed Control for Power Management in Server Class Disks," ISCA, 2003.

(Continued)

*Primary Examiner* — Eric S Cardwell
(74) *Attorney, Agent, or Firm* — Oren Reches (57) ABSTRACT

A control layer of a data storage system is configured to identify one or more physical data units in the physical storage, which are associated only with corresponding logical snapshot data units, and to reallocate such physical snapshot data units to a dedicated storage space. The dedicated storage space can be a low-power storage space, which includes one or more disks designated as low power disks. The reallocation of snapshot data units to low power disks can be carried out according to an energy-aware migration policy, directed for minimizing the activation of the low power disks, and maintaining the disks in an inactive state for longer periods of time.

27 Claims, 6 Drawing Sheets

(56) References Cited

OTHER PUBLICATIONS

Pinheiro, Eduardo et al., "Energy Conservation Techniques for Disk Array-Based Servers," Department of Computer Science, Rutgers University, 2004, pp. 68-78.

Zhu, Qingbo et al., "PB-LRU: A Self-Tuning Power Aware Storage Cache Replacement Algorithm for Conserving Disk Energy,"ICS, 2004, pp. 79-88.

Weddle, Charles et al,, "PARAID: A Gear-Shifting Power-Aware Raid," ACM Transactions on Storage, 2007, vol. 3, No. 3, pp. 13:1-13:33.

Yao, Xiaoyu et al,, "RIMAC: A Novel Redundancy-based Hierarchical Cache Architecture for Energy Efficient, High Performance Storage Systems," ACM, 2006, pp. 249-262.

Allalouf, Miriam et al., "Storage Modeling for Power Estimation," SYSTOR, 2009.

* cited by examiner

STORAGE SYSTEM WITH REDUCED ENERGY CONSUMPTION

This application relates to and claims priority from U.S. Provisional Patent Application No. 61/360,643 filed on Jul. 1, 2010 incorporated herein by reference in its entirety.

FIELD OF THE PRESENTLY DISCLOSED SUBJECT MATTER

This invention relates to the field of data storage systems configuration and management directed to reduced energy consumption.

BACKGROUND

One of current trends of development in the storage industry relates to methods and strategies for reduced energy consumption. Data centers may comprise nowadays dozens of storage systems, each comprising hundreds of disk drives. Clearly, most of the data stored in these systems is not in use for long periods of time, and hence most of the disks are likely to contain data that is not accessed for long periods of time. Power is unnecessarily spent in keeping all these disks spinning and, moreover, in cooling the data centers. Thus, efforts are now being invested in reducing energy-related spending in storage systems. Moreover, regulations are being increasingly enforced in many countries, forcing data centers to adopt "green" technologies for their servers and storage systems.

Some strategies have been developed for regulating energy use within the system, based on the possibility of transitioning the drives to a low-power state when they are not in use, and restoring the normal, or "active" state whenever needed.

Techniques that rely on the copying or migration of data can be referred to generally as "data-placing" techniques. For example, extra cache disks can be used to cache recently-accessed data while the original disks can remain mostly idle and, thus, in low-power mode.

Certain techniques are directed to classify data as "popular" or "unpopular" and rearrange and migrate different classes of data to separate sets of disks (or disk units) in such a way that utilization of data in the unpopular set is reduced, such that these disks can be transitioned to low-power mode.

References considered to be relevant as background to the presently disclosed subject matter are listed below. Acknowledgement of the references herein is not to be inferred as meaning that these are in any way relevant to the patentability of the presently disclosed subject matter.

US Patent application No. 2009/249001 (Narayanan et al.) discloses storage systems which use write off-loading. When a request to store some data in a particular storage location is received, if the particular storage location is unavailable, the data is stored in an alternative location. In one example, the particular storage location may be unavailable because it is powered down or because it is overloaded. The data stored in the alternative location may be subsequently recovered and written to the particular storage location once it becomes available.

U.S. Pat. No. 7,552,297 discloses a system and method directed to improve the efficiency of copy-on-write operations in a storage system. A PASS descriptor associated with partition PSS and a PDTT descriptor associated with partition PTT are maintained in a cache memory, with partition PSS associated with a source logical unit $LU_S$ and partition PTT associated with a source logical unit $LU_T$. An ICP flag is set in the PDSS and PDTT descriptors indicating that the PSS and PTT are undergoing a copy-on-write operation. Data is then dissociated with PTT and locations of each block of the PSS stored in memory are copied from the PDSS descriptor to the PDTT descriptor. A task is then created to fetch blocks of the PSS and the fetched blocks are copied from the PSS to the PTT.

SUMMARY

According to one aspect of the presently disclosed subject matter there is provided a method of operating a storage system with snapshot generating capability, the storage system comprising a control layer configured to present a plurality of logical allocation units, the control layer being associated with a cache memory and further operatively coupled to a physical storage space constituted by a plurality of disks, the method comprising:

identifying one or more physical data units being associated with one or more logical snapshot data units while not being associated with corresponding source logical data units; and migrating the identified physical data units to one or more disks in the physical storage space which are dedicated for storing snapshot data.

According to another aspect of the presently disclosed subject matter there is provided a storage system with snapshot generating capability, the storage system comprising a control layer configured to present a plurality of logical allocation units, the control layer being associated with a cache memory and further operatively coupled to a physical storage space constituted by a plurality of disks;

the control layer is further configured to allocate one or more disks in the physical storage space which are dedicated for storing snapshot data;

identify one or more physical data units being associated with one or more logical snapshot data units while not being associated with corresponding source logical data units; and migrate the identified physical data units to the one or more disks.

According to a further aspect of the presently disclosed subject matter there is provided a snapshot management unit operatively connectable to a storage system with snapshot generating capability, the storage system comprising a control layer configured to present a plurality of logical allocation units, the control layer being associated with a cache memory and further operatively coupled to a physical storage space constituted by a plurality of disks; the snapshot management unit is configured to identify one or more physical data units being associated with one or more logical snapshot data units while not being associated with corresponding source logical data units; and migrate the identified physical data units to one or more disks allocated in the physical storage space which are dedicated for storing snapshot data.

According to yet a further aspect of the presently disclosed subject matter there is provided a non-transitory computer readable medium storing a computer readable program executable by a computer for causing the computer to perform a process of operating a storage system with snapshot generating capability, the storage system comprising a control layer configured to present a plurality of logical allocation units, the control layer being associated with a cache memory and further operatively coupled to a physical storage space constituted by a plurality of disks, the process comprising:

identifying one or more physical data units being associated with one or more logical snapshot data units while not being associated with corresponding source logical data units;

migrating the identified physical data units to one or more disks in the physical storage space which are dedicated for storing snapshot data.

According to certain embodiments the one or more logical snapshot data units are related to a snapshot, generated in respect of source data, the snapshot associated with a first respective physical address allocated in the physical storage space for the source data.

In respect of the method, system, management unit and computer readable medium, the following is further disclosed:

According to certain embodiments the respective snapshot is generated in respect of a source data and associated with a first physical address allocated in the physical storage space for the source data, the method further comprising, responsive to a write-request in respect of at least part of the source data before the data is modified, copying an unmodified version of the at least part of the source data to the cache memory.

According to certain embodiments metadata is generated in respect of the unmodified version of the at least part of the source data copied to the cache memory, the metadata indicating that the unmodified version of the at least part of the source data is destined to one or more low power disks.

According to certain embodiments the one or more disks in the physical storage space which are dedicated for storing snapshot data include one or more low-power disks, and wherein the migration is performed in accordance with an energy-aware migration policy.

According to certain embodiments the snapshot is generated in respect of a source data and associated with a first respective physical address allocated in the physical storage space for the source data, the method further comprising, responsive to a write request, in respect of at least part of the source data, a modified version of the at least part of the source data is written to a second respective physical address allocated in the physical storage, while the corresponding to the at least part of the snapshot remains associated with a first physical address comprising the unmodified version of the at least part of the source data.

According to certain embodiments metadata is generate in respect of the unmodified version of the at least part of the source in the first physical address, the metadata indicating that the unmodified version of the at least part of the source data is destined to one or more low-power disks.

According to certain embodiments the unmodified version of the at least part of the source data, is reallocated from the first physical address to the storage space dedicated for storing snapshot data.

According to certain embodiments the one or more disks in the physical storage space which are dedicated for storing snapshot data include one or more low-power disks, and wherein the migration is performed in accordance with an energy-aware migration policy.

According to a non-limiting example, energy-aware migration policy can include one or more of the following rules:

Delaying destaging of data to the one or more low-power disks until a read-request to the low-power storage space is received;

Delaying destaging of data to the one or more low-power disks until data destined to a low-power storage space of a predefined minimum size is accumulated.

Delaying destaging of the data to the one or more low-power disks can be delayed until data destined to a low-power storage space has been in the cache memory for a period of time longer than a predefined time span.

Delaying destaging of the data to the one or more low-power disks until a predefined period of time elapses since the last IO request that was addressed to the low-power storage space.

Destaging of the data to the one or more low-power disks only if the overall level of activity in the system is not greater than a certain threshold.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Unless specifically stated otherwise, as apparent from the following discussions, it is appreciated that throughout the specification discussions utilizing terms such as identifying, migrating, allocating, generating, copying, destaging, or the like, include action and/or processes of a computer that manipulate and/or transform data into other data, said data represented as physical quantities, e.g. such as electronic quantities, and/or said data representing the physical objects. The term "computer" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 1:
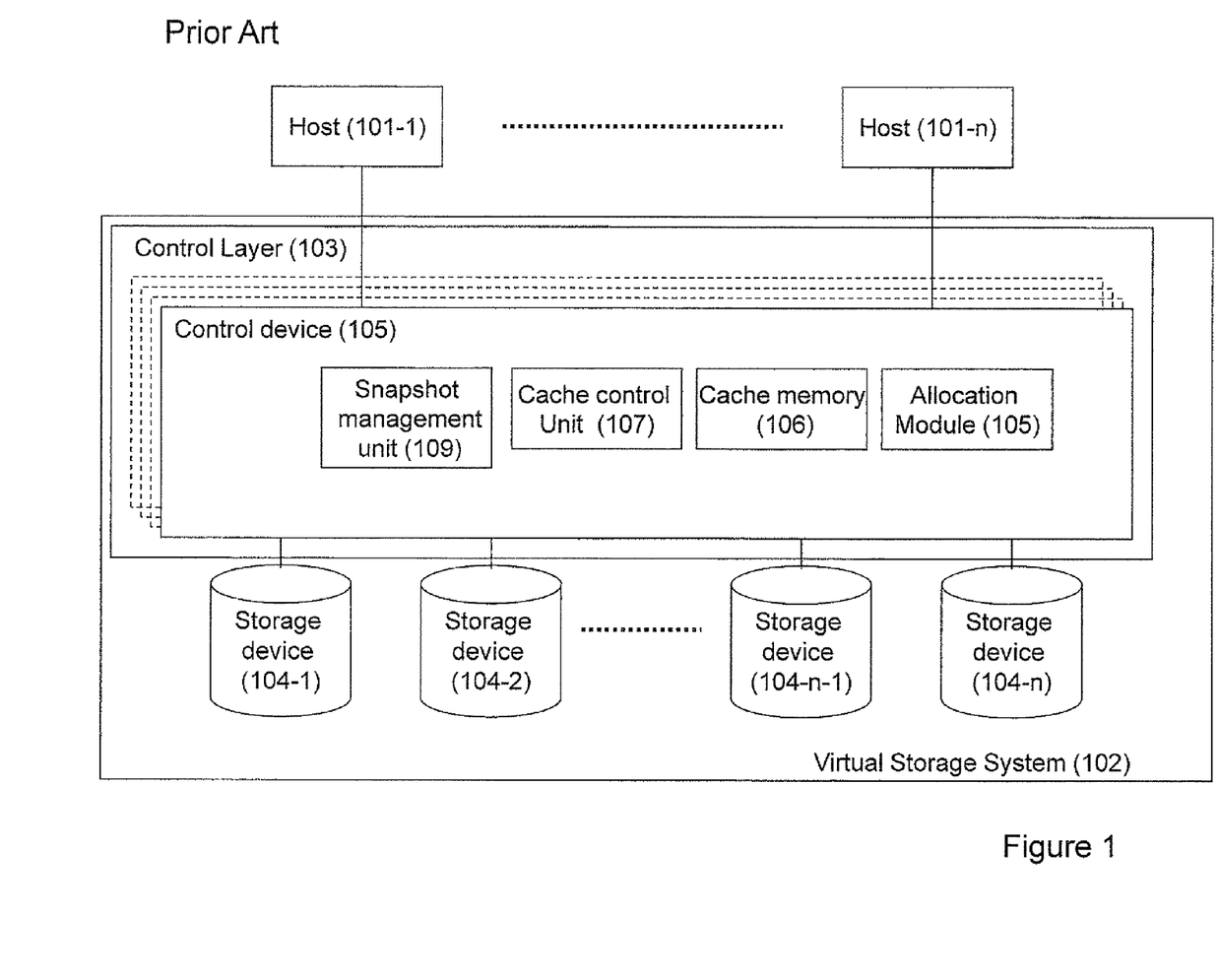
FIG. 1 illustrates a schematic functional block diagram of a computer system with a virtualized storage system, according to the disclosed subject matter.
Figure 2:
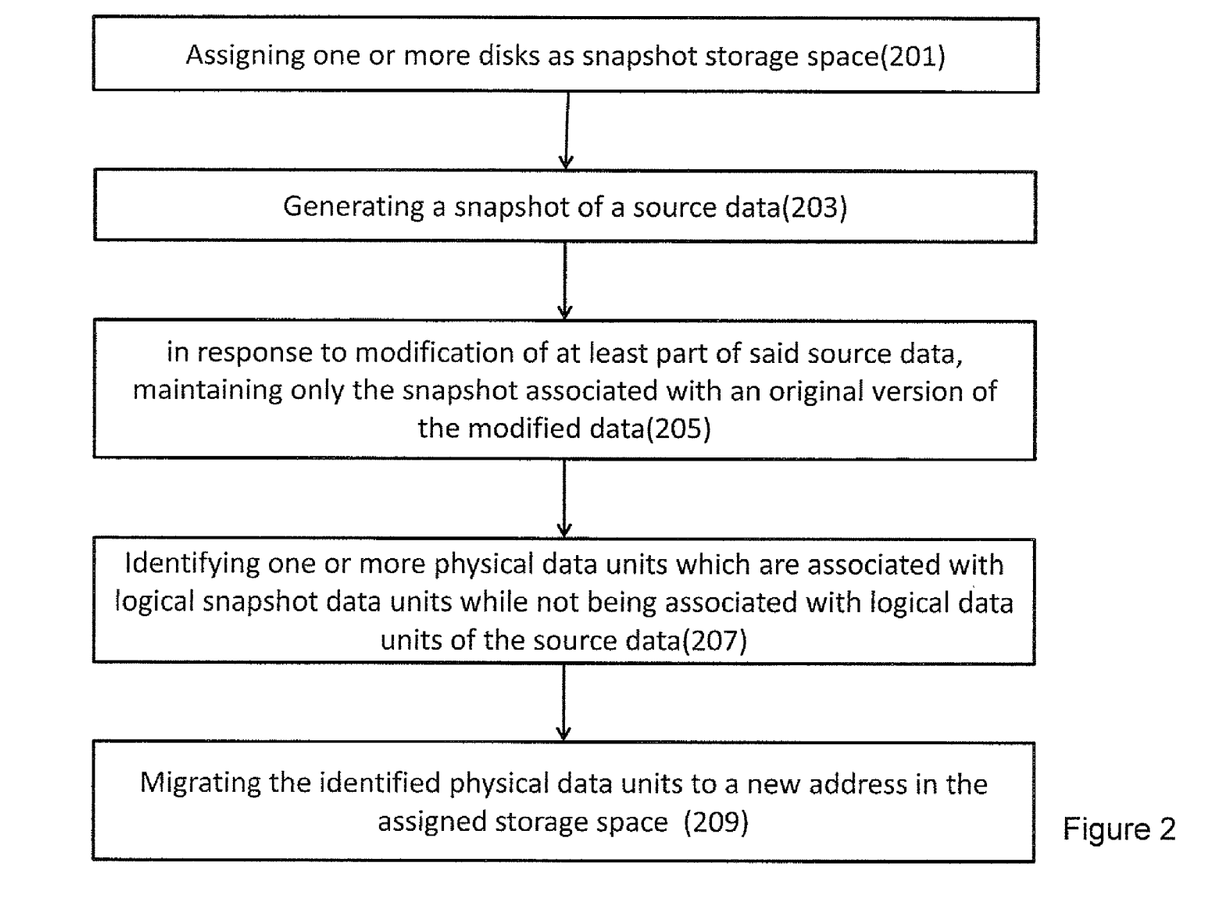
FIG. 2 is a flowchart illustrating operations which are performed, in accordance with the presently disclosed subject matter.
Figure 3:
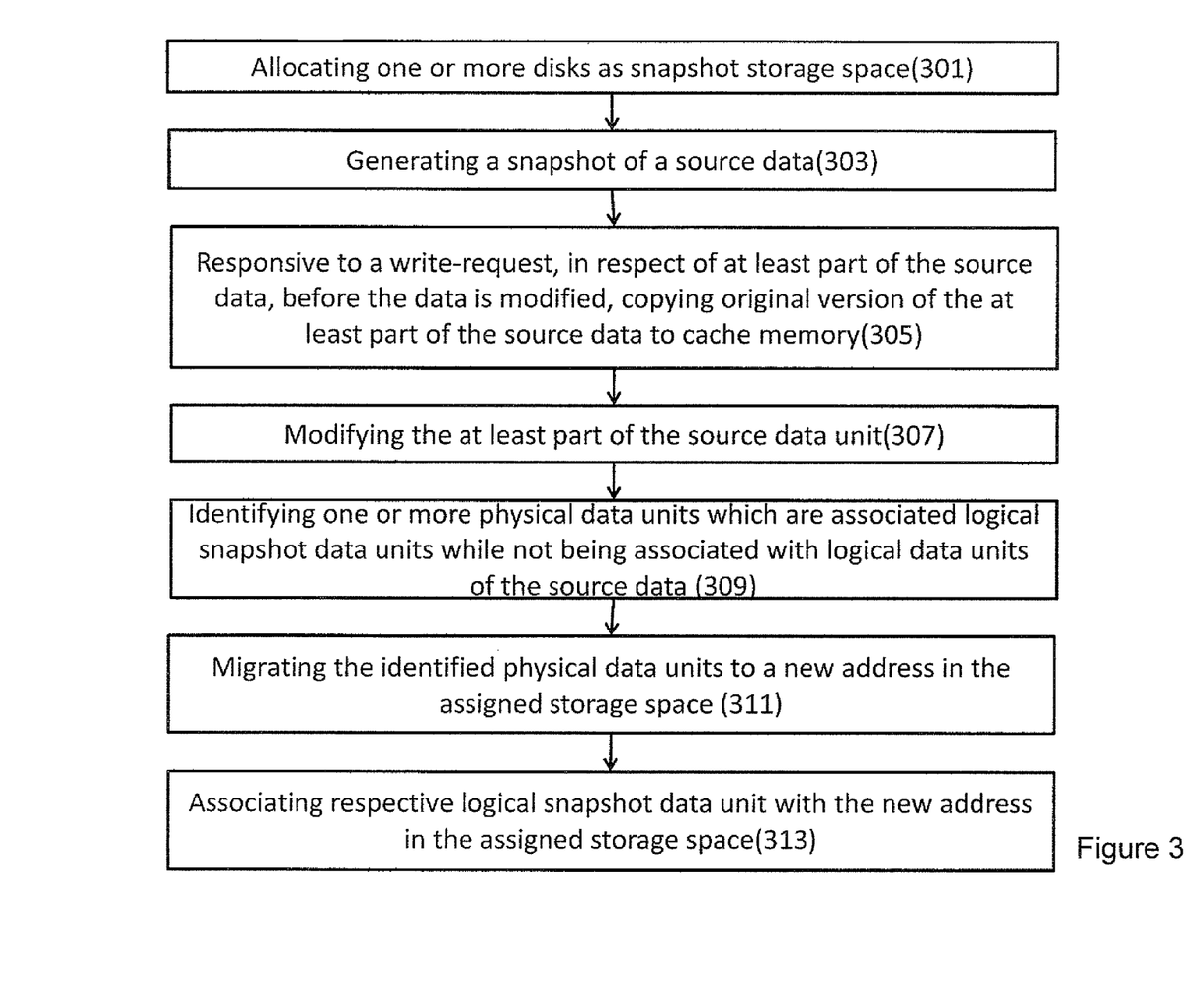
FIG. 3 is a flowchart illustrating an example of operations which are performed, in accordance with the presently disclosed subject matter.
Figure 4:
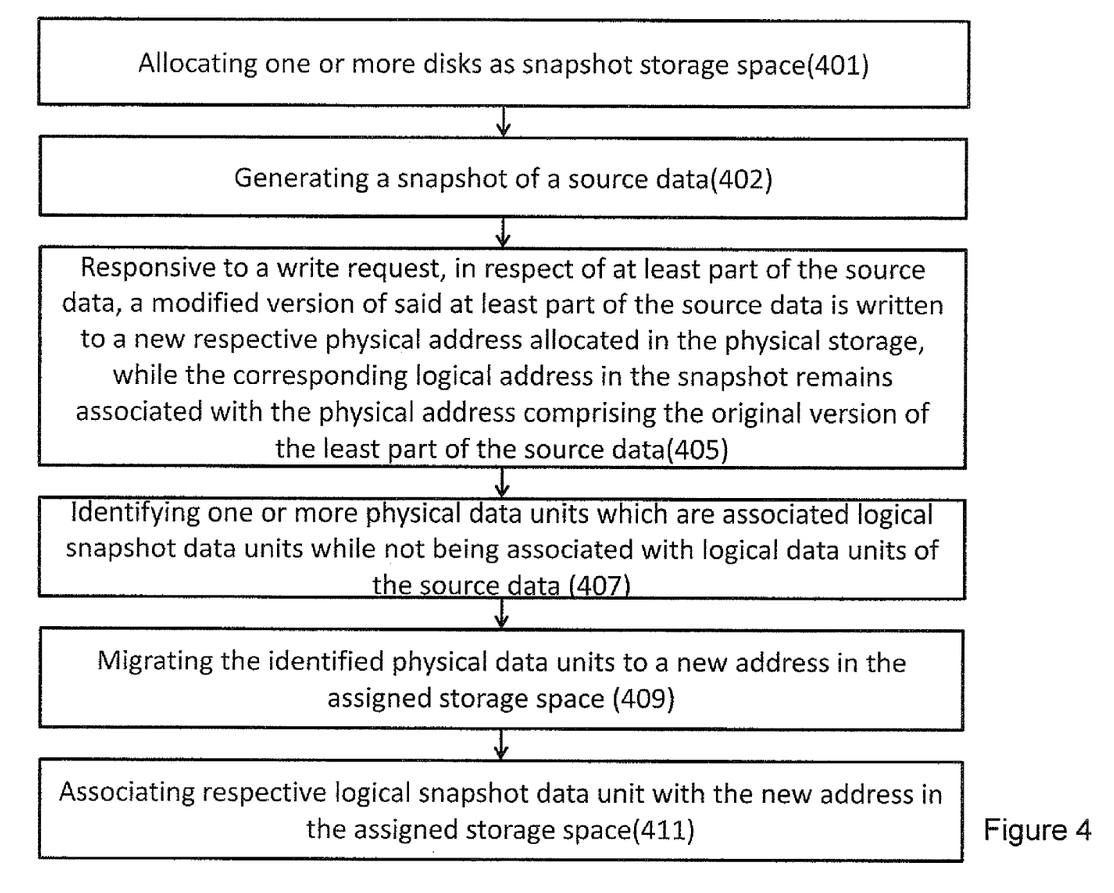
FIG. 4 is a flowchart illustrating another example of operations which are performed, in accordance with the presently disclosed subject matter.

In embodiments of the presently disclosed subject matter, fewer, more and/or different stages than those shown in FIG. 2, FIG. 3 and FIG. 4 may be executed. In embodiments of the presently disclosed subject matter one or more stages illustrated in FIG. 2, FIG. 3 and FIG. 4 may be executed in a different order and/or one or more groups of stages may be executed simultaneously. FIG. 1 illustrates a general schematic of the system architecture in accordance with an embodiment of the presently disclosed subject matter. Each module in FIG. 1 can be made up of any combination of software, hardware and/or firmware that performs the functions as defined and explained herein. The modules in FIG. 1 may be centralized in one location or dispersed over more than one location. In other embodiments of the presently disclosed subject matter, the system may comprise fewer, more, and/or different modules than those shown in FIG. 1.

Certain embodiments of the presently disclosed subject matter are applicable to the architecture of a computer system described with reference to FIG. 1. However, the disclosed subject matter is not bound by the specific architecture, equivalent and/or modified functionality may be consolidated or divided in another manner and may be implemented in any appropriate combination of software, firmware and hardware. Those versed in the art will readily appreciate that the disclosed subject matter is, likewise, applicable to any computer system and any storage architecture implementing a virtualized storage system. In different embodiments of the disclosed subject matter the functional blocks and/or parts thereof may be placed in a single or in multiple geographical locations (including duplication for high-availability); operative connections between the blocks and/or within the blocks may be implemented directly (e.g. via a bus) or indirectly, including remote connection. The remote connection may be provided via Wire-line, Wireless, cable, Internet, Intranet, power, satellite or other networks and/or using any appropriate communication standard, system and/or protocol and variants or evolution thereof (as, by way of unlimited example, Ethernet, iSCSI, Fiber Channel, etc.).

Bearing this in mind, attention is drawn to FIG. 1 illustrating a schematic functional block diagram of a computer system with a virtualized storage system, according to the disclosed subject matter. The computer system comprises a plurality of host computers (workstations, application servers, etc.) illustrated as $101_{1-n}$ sharing common storage means provided by a virtualized storage system 102. The storage system comprises a storage control layer 103 comprising one or more appropriate storage control devices operatively coupled to the plurality of host computers and a plurality of data storage devices $104_{1-n}$ constituting a physical storage space optionally distributed over one or more storage nodes, wherein the storage control layer 103 is operable to control interface operations (including I/O operations) between hosts $101_{1-n}$ and data storage devices $104_{1-n}$. The storage control layer 103 is further operable to handle a virtual representation of physical storage space and to facilitate necessary mapping between the physical storage space and its virtual representation. Control layer 103 is configured to create and manage at least one virtualization layer interfacing between elements of the computer system (host computers, etc.) external to the storage system and the physical storage space.

The virtualization functions may be provided in hardware, software, firmware or any suitable combination thereof. Optionally, the functions of control layer 103 may be fully or partly integrated with one or more host computers and/or storage devices and/or with one or more communication devices enabling communication between the hosts and the storage devices. Optionally, a format of logical representation provided by control layer 103 may differ, depending on interfacing applications.

The physical storage space may comprise any appropriate permanent storage medium and may include, by way of non-limiting example, one or more disk units (DUs), also called "disk enclosures", comprising several disk drives (disks). The physical storage space comprises a plurality of data blocks, each data block may be characterized by a pair ($DD_{id}$, DBA) where $DD_{id}$ is a serial number associated with the disk drive accommodating the data block, and DBA is a logical block number within the respective disk. By way of non-limiting example, $DD_{id}$ may represent a serial number internally assigned to the disk drive by the system or, alternatively, a WWN or universal serial number assigned to the disk drive by a vendor or manufacturer. The storage control layer 103 and storage devices $104_{1-n}$ may communicate with host computers $101_{1-n}$ and within the storage system in accordance with any appropriate storage protocol.

Stored data may be logically represented to a client (host) in terms of logical objects. Depending on the storage protocol, the logical objects may be logical volumes, data files, multimedia files, snapshots and other copies, etc.

A logical volume (LU) is a virtual entity logically presented to a client as a single virtual storage device. The logical volume represents a plurality of data blocks characterized by successive Logical Block Addresses (LBA) ranging from 0 to a number LUK. Different LUs may comprise different numbers of data blocks, while the data blocks are typically of equal size (e.g. 512 bytes). Blocks with successive LBAs may be grouped into portions that act as basic units for data handling and organization within the system. Thus, for instance, whenever space has to be allocated on a disk or on a memory component in order to store data, this allocation may be done in terms of "data portions" otherwise also known as "allocation units". Data portions are typically (but not necessarily) of equal size throughout the system. Successive data portions constituting a logical volume can be stored in different disk drives (e.g. for purposes of both performance and data protection), and to the extent that it is possible, across different DUs. In some cases, operations of the storage system 102 are described in terms of entire data portions. Those skilled in the art will readily appreciate that the teachings of the presently disclosed subject matter are applicable in a similar manner to parts of data portions.

Typically, definition of LUs in the storage system involves in-advance configuring an allocation scheme and/or allocation function used to determine the location of the various data portions (and their associated parity portions) across the physical storage medium. The allocation scheme can be handled for example, by an allocation module 105 being a part of the storage control layer 103. The location of various data portions allocated across the physical storage can be recorded and monitored with the help of one or more allocation tables linking between logical data addresses and their corresponding allocated location in the physical storage.

The allocation module 105 may be implemented as a centralized module operatively connected to the plurality of storage control devices or may be, at least partly, distributed over a part or all storage control devices. Logical contiguity of successive portions and physical contiguity of the storage location allocated to the portions in the system are not necessarily correlated.

In the present description the term "data unit" is used as a general term which includes units containing data of a certain size. For example, a data portion which is one type of data unit (e.g. with a size of 64 kilobyte) can be divided into 128 data units each of 512 bytes (e.g. blocks). Other data units of other sizes consisting of different numbers of bytes or bits can be defined as well.

As mentioned above, some techniques directed for reducing energy consumption of storage systems include the classification of data as "popular" or "unpopular" and rearrangement of the different classes of data in separate locations in the storage system. As unpopular data is accessed less frequently than popular data, disks which are designated for storing unpopular data can be maintained in a low-power mode for longer periods of times and thereby enable to reduce the power-consumption of the storage system.

Disks referred to hereinafter as "low-power disks" or disks "in low-power mode" or "low-power state", may be adapted, for example, to have reduced number of revolutions per minutes (RPM) or may be turned off. Turning the disk off may comprise either making it idle (in which case not only does the disk not rotate, but also the disk is electronically irresponsive), also called "sleep" state, or stopping the rotation but maintaining the disk in an electronically responsive state (also called "stand by" in the industry). Each of these low-power state options has well-known in the art advantages and disadvantages in terms of energy saving, time to return to active state, and wear-off produced by the change in state.

According to the presently disclosed subject matter there is provided a system (and corresponding method) configured with snapshot management facility operable to enable reductions of the storage system's power consumption.

In the context of computer storage "Snapshot" is a term which refers to a record or copy of data in a storage device made at a particular point in time. Snapshots enable to restore an older version of data stored on a storage device, e.g. in case of a failure of the device, and thus avoid data loss. Accordingly snapshots are commonly used for the purpose of data protection and data restoration. Since snapshots include data which is typically accessed less frequently than the corresponding source data (e.g. snapshot data is accessed when a need for data restoration arises), such data can be classified as unpopular and can be thus stored in low power storage devices (e.g. disks). In the following discussion the term "logical snapshot data unit" includes a logical data unit (defined by a logical address) which is designated as a snapshot of a corresponding source data unit.

In accordance with the presently disclosed subject matter, control device 110 can comprise a snapshot management unit 109. As explained with reference to FIG. 1, storage control layer 103 is operable to handle a virtual representation (or virtual layer) of physical storage space and to facilitate necessary mapping between the physical storage space and its virtual representation. Control layer 103 is configured to create snapshots by first allocating a logical address (comprising one or more logical snapshot data units) for the snapshot and then associating the logical address of the snapshot with a corresponding physical address in the physical storage.

Control layer 103 (with the help of snapshot management unit 109) is configured to operate a snapshot migration mechanism, which includes, inter alia, the migration of physical data units associated with a snapshot to dedicated disk drives. Snapshot management unit 109 is configured to identify one or more physical data units in the physical storage, which are associated only with corresponding logical snapshot data units and to reallocate (or migrate) such physical data units to a storage space dedicated for snapshots. The dedicated storage space can be a low-power storage space, which includes one or more disks designated as low power disks. The reallocation of the physical data units to low power disks can be carried out according to an energy-aware migration policy, directed for minimizing the activation of the low power disks, and maintaining the disks in an inactive state for longer periods of time. Snapshot management unit 109 may be implemented as a centralized module operatively connected to the plurality of storage control devices or may be, at least partly, distributed over a part or all storage control devices. It should be noted that as use herein the term "physical data unit" includes data units which are allocated to a physical address in the physical storage space. Any reference made to migration or allocation of physical data units refers to the migration or allocation of the corresponding data units allocated to the physical address of the physical data units.

A detailed description of the operations which are performed by control layer 103 as part of the snapshot migration mechanism is provided below with reference to FIG. 2, FIG. 3 and FIG. 4.

FIG. 2 is a flowchart illustrating operations which are performed, in accordance with the presently disclosed subject matter. The operations which are described with reference to FIG. 2 can be performed by control layer 103, for example, with the help of snapshot management unit 109.

A dedicated physical storage space for storing physical data units associated with snapshots is allocated within the system (Block 201). The dedicated storage space includes one or more disks, which can be low-power disks, operated in low-power mode. The number of disks which are allocated as low-power can depend, for example, on the scalability of the storage system. It should be noted that the phrase "low-power disk" refers to a disk which is maintained in a low-power state (e.g. sleep, idle etc.) and not necessarily to a permanent physical property of the disk. Accordingly, disks which are defined as "low-power" can become active and go out of low-power state, and disks which are active can become inactive and go into low-power state.

Block 203 describes the creation of a snapshot. A snapshot is created by generating a copy (or snapshot target) of an existing data (i.e. source data). A new logical block address in the virtual layer (including one or more logical snapshot data units) is allocated for the snapshot, and a snapshot relationship is established between the source data and the corresponding snapshot, within the domain of the virtual layer.

A snapshot can be created in accordance with a predefined policy. For example snapshots can be generated according to a preset schedule. In another example a snapshot can be created in response to a specific request. Snapshots can be created to all or part of the stored data. Often a snapshot is created for a given logical volume, or a "consistency group" of logical volumes.

According to one type of snapshot allocation methodology (named "copy-on-write"), when a snapshot is first created, since the snapshot is an exact copy of the source data, the logical snapshot data units, which are allocated for the snapshot in the virtual layer, are associated, (by way of some kind of pointers, as is well known in the art), with the physical data units allocated for the source data. At this point, no physical copy of the source data is created.

As a result of a modification of one or more physical data units of the source data (hereinafter "relevant part") for the first time after the snapshot was created, the logical data units of the source data, which correspond to the relevant part, are associated with a modified version of the data in the physical storage. The logical snapshot data units, which correspond to the relevant part, remain associated with the original (i.e. unmodified) version of the data (Block 205). This enables to restore the original version of the data with the help of the snapshot, in case a need for data restoration arises.

Modification of the source data can be the result of a write-request instructing to modify one or more physical data units of the source data which can be received, for example from one of the hosts ($101_{1-n}$). The write-request can be directed, for example, to a certain data portion (or a part thereof) in a given logical volume. In case IO (input/output) operations in the storage system are performed in data portions of predefined size, one or more data portions, which include the relevant part of the source data, are re-written together with the relevant part.

According to the presently disclosed subject matter, the original version of the relevant part, which is now associated only with the snapshot and not with the source data, can be migrated to the storage space dedicated for snapshots. To this end, physical data units which are associated only with corresponding logical snapshot data units are identified (Block 207). The identified physical data units are migrated to a new address in the storage space which has been allocated for storing snapshot physical data units (Block 209), and which is located in a low-powered storage space.

Different methods can be used in order to facilitate the identification of snapshot data units which are associated only with a snapshot and can be migrated to a storage space dedicated for snapshot data. For example, metadata can be associated with the physical data units of the original version of the relevant data, indicating that these physical data units are associated only with logical snapshot data units, and are therefore destined to be migrated to a storage space dedicated for snapshots. Alternatively or additionally, similar metadata can be associated with the logical snapshot data units corresponding to the relevant part.

According to one non-limiting example, such metadata can be generated and added to the information in the logical layer which, inter alia, characterizes the stored data and enables to associate between a logical address and the corresponding physical address to the data. This information can be maintained, for example, in the form of a table, specifying the address of the physical data units which are destined to be migrated to snapshot dedicated storage space, along with additional information, such as the time the source data was modified (e.g. when the write-request was executed).

When the relevant part of the source data is modified and only the snapshot remains associated with the original version of the relevant part, metadata in respect of the relevant part is generated, indicating that the relevant part is destined to be migrated to a storage space dedicated for snapshot data. Generation of the metadata can be performed, for example, with the help of snapshot management unit 109 and/or allocation module 105.

As explained above, in order to reduce energy consumption of the storage space the storage space which is dedicated for snapshots includes one or more low-power disks. In order to further reduce the energy consumption of the storage system migration of snapshot data to the low-power disks is performed according to an energy-aware migration policy. The energy-aware migration policy is configured in order to manage the migration of the data to the low-power disk in a way which enables to reduce the number of times low power disks are activated and thus maintain low-power disks in a low power state for longer periods of time. Different rules can be implemented as part of the energy-aware migration policy. Examples of such rules are provided below with reference to FIG. 3 and FIG. 4.

FIG. 3 is a flowchart illustrating an example of operations which are performed, in accordance with the presently disclosed subject matter. The operations which are described with reference to FIG. 3 can be performed by control layer 103, with the help of snapshot management unit 109.

In FIG. 3 the operations which are described with reference to Block 301 and Block 303 are similar to the operations described above with reference to Block 201 and Block 203 respectively. These operations include, designating a snapshot storage space, which includes one or more disks in low-power state, generating a snapshot of a source data, and associating the source data and the snapshot with a first respective physical address allocated in the physical storage space for the source data.

As explained above with reference to FIG. 2 a write-request instructing to modify one or more physical data units of the source data (the relevant part) for the first time after the snapshot was generated, can be received, for example from one of the hosts ($101_{1-n}$). According to the example illustrated with reference to FIG. 3, in response to a write request, before the request is executed and the relevant part of the source data is modified, the original version (i.e. unmodified version) of the relevant part, is copied to cache memory 106 (Block 305). This operation can be performed for example, with the help of cache control unit 107. In case IO (input/output) operations in the storage system are performed in data portions of predefined size, one or more data portions, which include the relevant part of the source data, are copied to the cache.

Once a copy of the original version of the relevant part of the source data is stored in the cache memory 106, the relevant part of the source data, in its original physical location, can be modified, in accordance with the specifications of the write-request (Block 307). The modified version of the relevant part of the source data is associated with a corresponding logical data unit of the source data.

At this point the original version of the relevant part of the source data is stored in the cache memory and is associated only with the snapshot, while the logical units of the source data are associated with a modified version of the relevant part. According to the presently disclosed subject matter, physical data units which are associated only with a corresponding logical snapshot data unit are identified (Block 309) and the corresponding data is migrated to the storage space which was allocated for snapshot data (Block 311). As explained above, with reference to FIG. 2, data destined to be migrated to snapshot storage space can be identified with the help of metadata. In the current example, metadata indicating that the relevant data is destined for migration can be generated once the relevant part is copied to the cache memory 106 (i.e. once its physical location is modified).

In general, data which is stored in the cache memory 106 is designated to be destaged to one or more disks in the physical storage. According to the presently disclosed subject matter, the destaging is performed in accordance with an energy-aware migration policy. There follows a number of examples of rules which can be implemented as part of the energy-aware migration policy.

According to one example, once one or more data units which are stored in the cache memory 106 are identified as destined to low-power disk, the actual migration of the data to a low power disk is delayed until a requirement to activate the relevant low-power disk arises for a different reason. Such a reason can be, for example, a read-request addressed to the same disk, initiated by an external host. As this request is to be fulfilled (the host is waiting for the requested data) and the disk ought to be activated in order to execute the read-request, control layer 103 can take advantage of this activation to migrate the snapshot data to the low-power disk. This way the low-power disk is not activated solely for the purpose of writing the snapshot related data.

According to another example, destaging of the data from the cache memory 106 to the low-power storage space can be delayed until data destined to a low-power storage space of a predefined minimum size is accumulated in the cache. As before, this rule helps to reduce the number of times the low-power storage is activated as a result of the destaging.

There follows a few additional examples:

Destaging of the data from the cache memory to the low-power storage space can be delayed until data destined to a low-power storage space has been in the cache memory 106 for a period of time longer than a predefined time span.

Destaging of the data from the cache memory 106 to the low-power storage space can be delayed until a predefined period of time elapses since the last IO request that was addressed to the low-power storage space.

Destaging of the data from the cache memory 106 to the low-power storage space can be executed only if the overall level of activity in the system is not greater than a certain threshold.

After the data is destaged to a low-power disk the corresponding logical snapshot data units are associated with the new physical address in the low-power disk (Block 313). The logical block address of the snapshot can be partly associated with the original version of the relevant part allocated to the low-power disk and partly with the physical address allocated for other parts of the source data which have not been modified.

It should be noted that the energy-aware migration policy can include any one or more of the above examples. Furthermore, the energy-aware migration policy is not limited to the examples which were illustrated above and can include other methods as well.

FIG. 4 is a flowchart illustrating another example of operations which are performed, in accordance with the presently disclosed subject matter. The operations which are described with reference to FIG. 4 can be performed by control layer 103, possibly with the help of snapshot management unit 109.

The operations associated with Block 401 and Block 403, are similar to the operations described above with reference to Block 301 and Block 303 respectively which were described above with reference to FIG. 3.

Unlike the previous scenario illustrated with respect to FIG. 3, here in response to a write-request, the new modified data is written to a different physical address allocated in the physical memory, and the respective logical address of the source data is associated with this address. The corresponding logical address in the snapshot remains associated with the physical location of the original (i.e. unmodified) data (Block 405). This data allocation methodology is commonly known as "log-write".

Figure 5A:
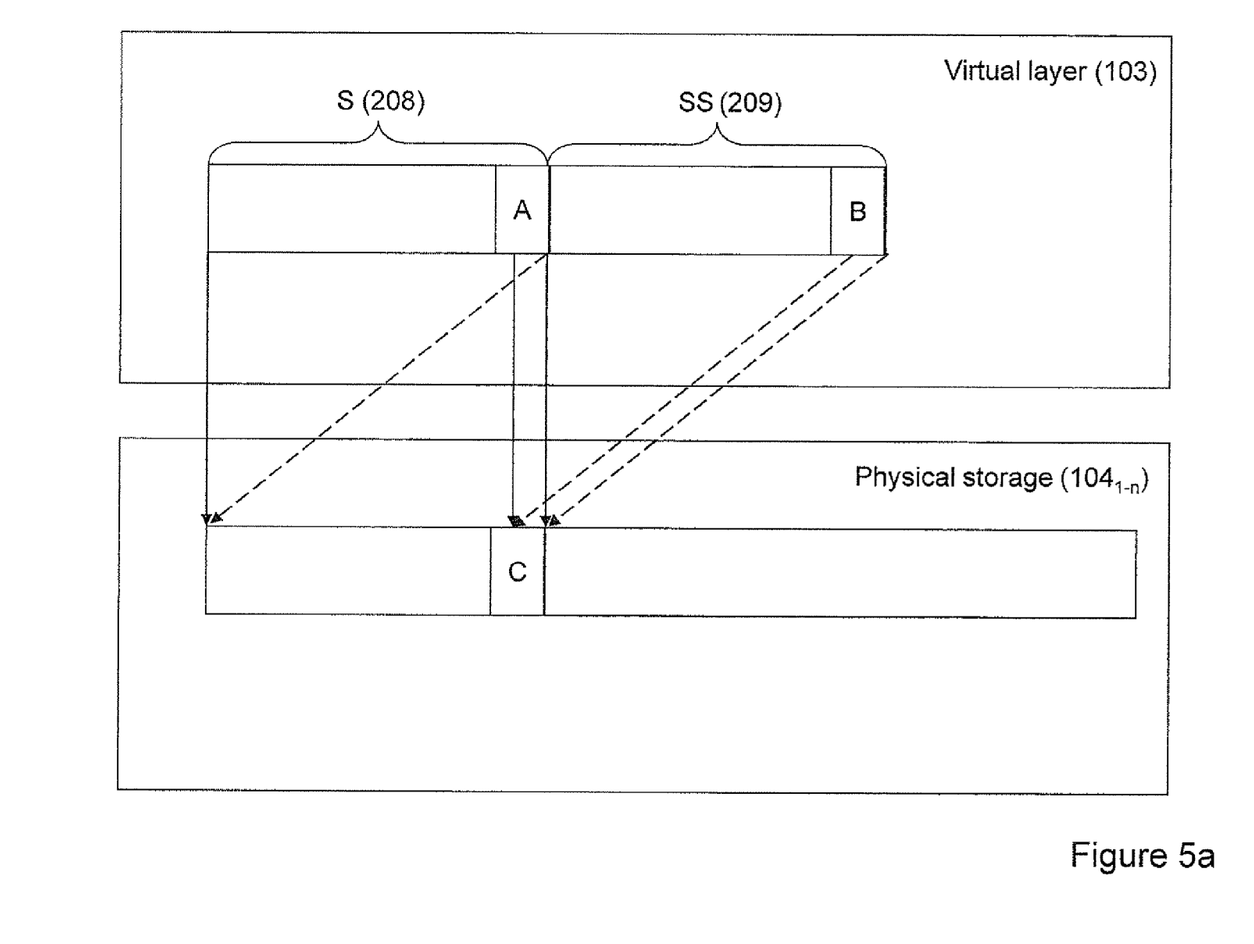
FIG. 5a and FIG. 5b are schematic illustrations demonstrating one type of writing methodology which is utilized, in accordance with the presently disclosed subject matter.
Figure 5B:
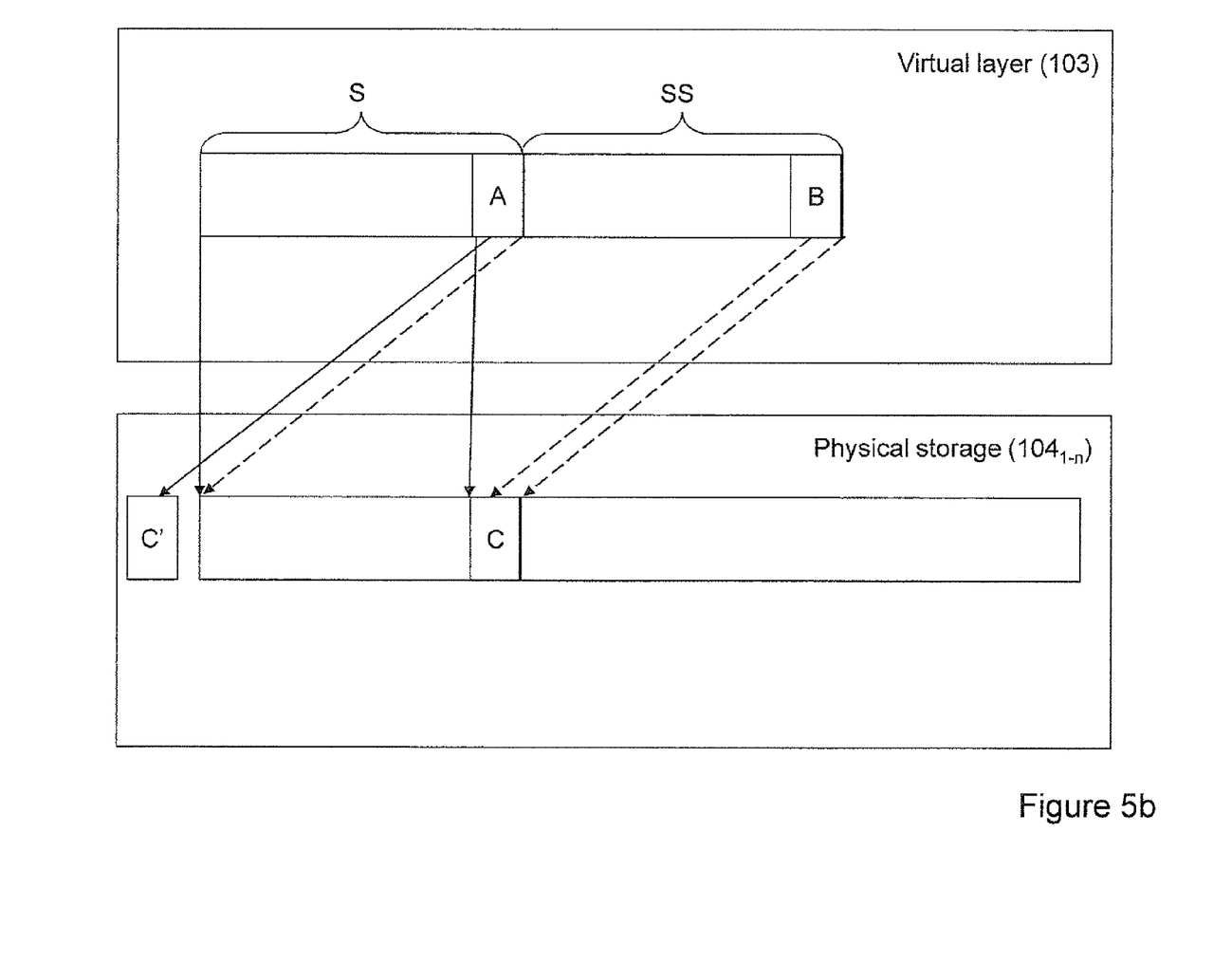

FIG. 5a and FIG. 5b are schematic illustrations demonstrating log-write writing methodology which is utilized, in accordance with the presently disclosed subject matter. For the sake of example, consider a scenario where a snapshot SS is created for a source logical volume S. As depicted in FIG. 5a, initially, both S and SS are associated with the same physical block address, allocated for logical volume S. More specifically note that in the current example, block A in S and block B in SS both are associated with block C in the physical storage. Dashed lines indicate association between SS to physical storage and filled lines indicate association between S to physical storage.

Turning now to FIG. 5b, consider an incoming write-request, instructing to modify the data associated with block A, at time T. In response to the write request, logical block A is associated with a modified version of block C (say C') written to a new location in the physical storage. Logical block B, in snapshot SS, remains associated with data block C, comprising the unmodified data. As explained above, block B (or entire data portion comprising block B in case B is smaller than the size of a data portion) is identified as data which is destined to be migrated to low-power storage.

Turning now to Block 407, at this point the original version of the relevant part of the source data is stored in its original physical address and is associated only with the snapshot, while the source data is associated with a new physical address allocated for a modified version of the relevant part. According to the presently disclosed subject matter, physical data units which are associated only with a corresponding logical snapshot data unit are identified (Block 407) and migrated to the storage space which was allocated for snapshot data (Block 409).

As explained above, with reference to FIG. 3, data destined to be migrated to snapshot storage space can be identified with the help of metadata. In the current example, the metadata can be associated with the original version of the relevant part once the modified version of the relevant part is allocated to a new physical address in the storage system. This metadata can later be used for identifying data units which are destined to be migrated to storage space dedicated for snapshots.

As explained before, storage space dedicated for snapshot data can include one or more low-power disks. According to the presently disclosed subject matter, data which is identified as destined to snapshot dedicated storage space can be migrated to its destination, according to an energy-aware migration policy. In this case the migration is performed from the original physical address allocated for the source data to a new physical address in one or more low-power disks.

As explained above, different rules can be implemented as part of the energy-aware migration policy. In some cases similar rules to the ones described above with reference to FIG. 3 can be implemented.

According to the example illustrated herein with reference to FIG. 4, energy-aware migration policy can include one set of rules for migrating snapshot data to the cache memory and another set of rules for destaging data from the cache memory to a low-power storage space. The first set of rules can comprise, for example, one or more of the rules specified above with reference to FIG. 3 and the second set of rules can also comprise, one or more of the rules described with reference to FIG. 3.

After the data is reallocated to a low-power disk the corresponding logical address of the data in the snapshot is associated with the new physical address in the low-power disk (Block 411). The logical block address of the snapshot can be partly associated with the relevant data stored in the low-power disk and partly with the physical address allocated for the unmodified part of the source data. As before, the logical block address of the snapshot can be partly associated with the original version of the relevant part allocated to the low-power disk and partly with the physical address allocated for other part of the source data which has not been modified.

A background process can be executed by control layer 103, directed for going over the metadata which is available in respect of snapshots and identifying data units which are destined to low-power disks, for example, based on the relevant metadata. Once identified, the background process proceeds and migrates these data units to low-power disks based on the rules of the energy-aware migration policy. The background process can run as a complementary process to a snapshot generation and allocation process which can operate independently of the background process, according to the principles described above with reference to FIG. 3.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable memory tangibly embodying a program of instructions executable by the machine for executing the method of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A method of operating a storage system with snapshot generating capability, the storage system comprising a control layer configured to present a plurality of logical allocation units, said control layer being associated with a cache memory and further operatively coupled to a physical storage space constituted by a plurality of disks, the method comprising:
   identifying one or more physical data units being associated with one or more logical snapshot data units while not being associated with corresponding source logical data units; wherein the one or more logical snapshot data units are designated as a snapshot of the corresponding source logical data units;
   migrating the identified physical data units to one or more disks in said physical storage space which are dedicated for storing snapshot data.

2. The method of claim 1 wherein said one or more snapshot logical snapshot data units are related to a snapshot generated in respect of a source data, said snapshot associated with a first respective physical address allocated in the physical storage space for the source data.

3. The method of claim 1 further comprising allocating said one or more disks in said physical storage space to be dedicated for storing snapshot data.

4. The method of claim 1, wherein respective snapshot is generated in respect of a source data and associated with a first physical address allocated in the physical storage space for the source data, the method further comprising, responsive to a write-request in respect of at least part of the source data before the data is modified, copying an unmodified version of the at least part of the source data to the cache memory.

5. The method of claim 4 further comprising generating metadata in respect of said unmodified version of the at least part of the source data copied to said cache memory, said metadata indicating that said unmodified version of the at least part of the source data is destined to said to one or more disks.

6. The method of claim 4 wherein said migrating further includes destaging the unmodified version of the at least part of the source data, from said cache memory, to said storage space dedicated for storing snapshot data.

7. The method of claim 1 further comprising associating said one or more logical snapshot data units, with said physical data units migrated to said one or more disks.

8. The method of claim 1 wherein data allocation in said storage system is performed in predefined data portions, and wherein said migration includes migrating at least one data portion comprising said one or more physical data units.

9. The method of claim 1 wherein said one or more disks in said physical storage space which are dedicated for storing snapshot data include one or more low-power disks, and wherein said migration is performed in accordance with an energy-aware migration policy for reducing a number of times the one or more low power disks are activated.

10. The method of claim 1 wherein said one or more disks in said physical storage space which are dedicated for storing snapshot data include one or more low-power disks, wherein said one or more low-power disks are maintained in one of the following states: idle; sleep; and standby.

11. The method of claim 9 wherein said energy-aware migration policy includes at least one of the following rules:
   delaying destaging of data from a cache to said one or more low-power disks until a read-request to said one or more low-power disks is received;
   delaying destaging of data from the cache to said one or more low-power disks until data destined to said one or more low-power disks of a predefined minimum size is accumulated in the cache.

12. The method of claim 1 wherein said snapshot is generated in respect of a source data and associated with a first respective physical address allocated in the physical storage space for the source data, the method further comprising, responsive to a write request, in respect of at least part of the source data, a modified version of said at least part of the source data is written to a second respective physical address allocated in the physical storage, while the corresponding to the at least part of the snapshot remains associated with a first physical address comprising the unmodified version of the at least part of the source data.

13. The method of claim 12 further comprising generating metadata in respect of said unmodified version of the at least part of the source in said first physical address, said metadata indicating that said unmodified version of the at least part of the source data is destined to said one or more disks.

14. The method of claim 12 wherein said migrating further includes reallocating the unmodified version of the at least part of the source data, from said first physical address to said storage space dedicated for storing snapshot data.

15. A storage system with snapshot generating capability, the storage system comprising a control layer configured to present a plurality of logical allocation units, said control layer being associated with a cache memory and further operatively coupled to a physical storage space constituted by a plurality of disks;
   said control layer is further configured to allocate one or more disks in said physical storage space which are dedicated for storing snapshot data;

identify one or more physical data units being associated with one or more logical snapshot data units while not being associated with corresponding source logical data units; wherein the one or more logical snapshot data units are designated as a snapshot of the corresponding source logical data units; and migrate the identified physical data units to the one or more disks.

16. The system of claim 15 wherein said one or more snapshot logical snapshot data units are related to a snapshot generated in respect of a source data, said snapshot associated with a first respective physical address allocated in the physical storage space for the source data.

17. The system of claim 15, wherein respective snapshot is generated in respect of a source data and associated with a first physical address allocated in the physical storage space for the source data, said control layer is further configured responsive to a write-request in respect of at least part of the source data before the data is modified, copying an unmodified version of the at least part of the source data to the cache memory.

18. The system of claim 17 wherein said control layer is further configured to generate metadata in respect of said unmodified version of the at least part of the source data copied to said cache memory, said metadata indicating that said unmodified version of the at least part of the source data is destined to be migrated to said one or more disks.

19. The system of claim 15 wherein said one or more disks in said physical storage space which are dedicated for storing snapshot data include one or more low-power disks, and wherein said control layer is further configured to migrate the identified physical data units to the one or more low-power disks in accordance with an energy-aware migration policy for reducing a number of times the one or more low power disks are activated.

20. The system of claim 19 wherein said energy-aware migration policy includes at least one of the following rules:
delaying destaging of data from a cache to said one or more low-power disks until a read-request to said one or more low-power disks is received;
delaying destaging of data from the cache to said one or more low-power disks until data destined to said one or more low-power disks of a predefined minimum size is accumulated in the cache.

21. The system of claim 15 wherein said snapshot is generated in respect of a source data and associated with a first respective physical address allocated in the physical storage space for the source data, said control layer is further configured, responsive to a write request, in respect of at least part of the source data, to write a modified version of said at least part of the source data to a second respective physical address allocated in the physical storage, while the corresponding to the at least part of the snapshot remains associated with a first physical address comprising the unmodified version of the at least part of the source data.

22. The system of claim 21 wherein said control layer is further configured to generate metadata in respect of said unmodified version of the at least part of the source in said first physical address, said metadata indicating that said unmodified version of the at least part of the source data is destined to said one or more disks.

23. A snapshot management unit operatively connectible to a storage system with snapshot generating capability, the storage system comprising a control layer configured to present a plurality of logical allocation units, said control layer being associated with a cache memory and further operatively coupled to a physical storage space constituted by a plurality of disks,
said snapshot management unit being configured to identify one or more physical data units being associated with one or more logical snapshot data units while not being associated with corresponding source logical data units, wherein the one or more logical snapshot data units are designated as a snapshot of the corresponding source logical data units; and migrate the identified physical data units to one or more disks allocated in said physical storage space which are dedicated for storing snapshot data.

24. A non-transitory computer readable medium storing a computer readable program executable by a computer for causing the computer to perform a process of operating a storage system with snapshot generating capability, the storage system comprising a control layer configured to present a plurality of logical allocation units, said control layer being associated with a cache memory and further operatively coupled to a physical storage space constituted by a plurality of disks, the process comprising:
identifying one or more physical data units being associated with one or more logical snapshot data units while not being associated with corresponding source logical data units; wherein the one or more logical snapshot data units are designated as a snapshot of the corresponding source logical data units;
migrating the identified physical data units to one or more disks in said physical storage space which are dedicated for storing snapshot data.

25. The program storage device of claim 24 wherein said snapshot is generated in respect of a source data and associated with a first respective physical address allocated in the physical storage space for the source data wherein said process further comprising, responsive to a write-request, in respect of at least part of the source data, before the data is modified, copying an unmodified version of the at least part of the source data to cache memory.

26. The program storage device of claim 24 wherein said snapshot is generated in respect of a source data and associated with a first respective physical address allocated in the physical storage space for the source data wherein said process further comprises, responsive to a write request, in respect of at least part of the source data, a modified version of said at least part of the source data, written to a second respective physical address allocated in the physical storage, while the corresponding to at least part of the snapshot remains associated with a first physical address comprising the unmodified version of the at least part of the source data.

27. The program storage device of claim 24 wherein said one or more disks in said physical storage space which are dedicated for storing snapshot data include one or more low-power disks, the process further comprising migrating the identified physical data units to the one or more low-power disks in accordance with an energy-aware migration policy.

* * * * *